United States Patent
Ash et al.

(10) Patent No.: US 8,140,811 B2
(45) Date of Patent: Mar. 20, 2012

(54) NONVOLATILE STORAGE THRESHOLDING

(75) Inventors: Kevin J. Ash, Tucson, AZ (US); Lokesh M. Gupta, Tucson, AZ (US); Matthew J. Kalos, Tucson, AZ (US); Alfred E. Sanchez, Tucson, AZ (US); Kenneth W. Todd, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 421 days.

(21) Appl. No.: 12/489,107

(22) Filed: Jun. 22, 2009

(65) Prior Publication Data

US 2010/0325356 A1    Dec. 23, 2010

(51) Int. Cl.
G06F 12/08    (2006.01)
G06F 13/00    (2006.01)

(52) U.S. Cl. .............. 711/170; 711/113; 711/E12.001; 711/E12.019

(58) Field of Classification Search .......... 711/113, 711/170, E12.001, E12.019
See application file for complete search history.

(56) References Cited

U.S. PATENT DOCUMENTS

| 7,266,017 B2 | 9/2007 | Harari et al. |
| 7,424,587 B2 | 9/2008 | Caulkins et al. |
| 7,464,240 B2 | 12/2008 | Caulkins et al. |
| 2007/0094445 A1 | 4/2007 | Trika et al. |

OTHER PUBLICATIONS

J. Matthews et al., "Intel Turbo Memory: Nonvolatile Disk Caches in the Storage Hierarchy of Mainstream Computer Systems," ACM Transactions on Storage, vol. 4, No. 2, Article 4, May 2008, pp. 4:1-4:24.

M. Moshayedi et al., "Enterprise SSDs," ACM Queue, Jul./Aug. 2008, pp. 32-39.

*Primary Examiner* — Yong Choe
(74) *Attorney, Agent, or Firm* — Griffiths & Seaton PLLC

(57) ABSTRACT

Embodiments for facilitating data transfer between a nonvolatile storage (NVS) write cache and a pool of target storage devices are provided. Each target storage device in the pool of target storage devices is determined as one of a hard disk drive (HDD) and a solid-state drive (SSD) device, and classified into one of a SSD rank group and a HDD rank group. If no data is received in the NVS write cache for a predetermined time to be written to a target storage device classified in the SSD rank group, a threshold of available space in the NVS write cache is set to allocate at least a majority of the available space to the HDD rank group. Upon receipt of a write request for the SSD rank group, the threshold of the available space is reduced to allocate a greater portion of the available space to the SSD rank group.

25 Claims, 4 Drawing Sheets

NONVOLATILE STORAGE THRESHOLDING

BACKGROUND OF THE INVENTION

1. Field of the Invention

The present invention relates in general to computers, and more particularly to a method, system, and computer program product for facilitating data transfer between a nonvolatile storage (NVS) write cache and a pool of target storage devices.

2. Description of the Related Art

Storage devices such as disks are commonplace in today's society. Devices such as controllers control access to the storage devices in response to read and write requests. The storage controllers also mirror data to different storage devices and spread data amongst different storage devices for redundancy and backup purposes. Storage controllers may store data in accordance with one of several redundant array of independent disk (RAID) security levels. Generally, the higher the RAID level the greater the redundancy of the data storage. Pooled storage devices may be used to increase storage capacity and provide recovery and backup services.

Storage servers, such as an IBM® Enterprise Storage Server® (ESS), are also becoming commonplace. One IBM® ESS storage server includes two clusters of processors (controllers) and associated hardware. Typically, there are multiple processors in each cluster. Each of the storage controllers is responsible for multiple storage devices grouped in RAID arrays. In one environment, clients with Fibre Channel Host Bus Adapters (HBAs) are coupled via a Fibre Channel to a switch. The switch is also coupled to the Storage Server with Fibre Channel HBAs. There may be multiple storage servers per client. Each client is assigned or allocated storage "volumes" which are mapped to physical locations on storage devices that are grouped in RAID arrays. Consequently, clients make data access requests (reads and writes) to the storage server, for data within their allocated volumes, and the storage server accesses the mapped locations in cache storage to satisfy the requests or from disk if the data does not reside in cache storage.

One IBM® ESS comprises a storage controller with two clusters and four processors per cluster. Each cluster has its own cache (semiconductor) memory shared by all processors in the cluster. Each cluster also has nonvolatile storage (NVS) that is shared by all of the processors in the cluster. The cache memory is used for rapid access to data inpaged from external storage to service read data access requests from memory and to provide buffering of modified data. All write requests are written to the cache on the cluster managing a given volume and are mirrored in the nonvolatile memory on the other cluster.

SUMMARY OF THE INVENTION

In cached controllers such as the storage controller previously described, current mechanisms allow for NVS space to be allocated for data transfer between target storage devices based on the storage device's individual rank. This prevents a single rank failure from consuming all of the available NVS space, and allows for multiple rank failures before all of the available NVS space is consumed by failed ranks. With the addition of differing types of storage media to storage servers, such as so-called "Nearline" class disk drives, which reduce their speed in order to correspondingly reduce their operating temperature in heavy use scenarios, typical Enterprise class hard disk drives (HDDs), and more recently, solid-state drives (SSD) making use of flash memory devices, each storage media has accompanying performance characteristics. For example, SSD devices significantly reduce latency and provide increased performance vis-à-vis traditional HDD devices. As a result, a need exists for a mechanism to dynamically allocate NVS space based on the type of storage media addressed, so as to allow devices such as SDD devices to operate efficiently while preventing the available NVS space from being consumed by slower devices.

Accordingly, in view of the foregoing, various method, system, and computer program product embodiments for facilitating data transfer between a nonvolatile storage (NVS) write cache and a pool of target storage devices by a processor are provided. In one embodiment, by way of example only, each target storage device in the pool of target storage devices is determined as one of a hard disk drive (HDD) and a solid-state drive (SSD) device. The target storage device is classified into one of a SSD rank group and a HDD rank group in the pool of target storage devices. If no data is received in the NVS write cache for a predetermined time to be written to a target storage device classified in the SSD rank group, a threshold of available space in the NVS write cache is set to allocate at least a majority of the available space to the HDD rank group. Upon receipt of a write request for the SSD rank group, the threshold of the available space in the NVS write cache is reduced to allocate a greater portion of the available space to the SSD rank group.

Conversely, if no data is received in the NVS write cache for the predetermined time to be written to a target storage device in the HDD rank group, the threshold of the available space in the NVS write cache is set to allocate at least the majority of the available space to the SSD rank group. Upon receipt of a write request for the HDD rank group, the threshold of the available space in the NVS write cache is reduced to allocate a greater portion of the available space to the HDD rank group.

Related system and computer program product embodiments are also disclosed and provide additional advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide mechanisms for facilitating data transfer between an NVS write cache and a pool of target storage devices. The pool may contain a variety of types of devices, such as SSD devices, Enterprise HDD devices, and Nearline HDD devices. The mechanisms of the present invention detect such devices and determine their classification into several rank groups, such as Nearline, SSD, and Enterprise rank groups. At initialization and/or at a later time when a device is added or removed from the pool, the threshold for NVS space for each of these groups is initially set as will be described. Based on current data movement (i.e., write activity), such as whether writes to the storage devices are occurring in a predetermined time, the available space in the NVS write cache is dynamically allocated. Such dynamic allocation prevents slower devices from consuming all available NVS space, while allowing higher performance devices to operate most efficiently.

Figure 1:
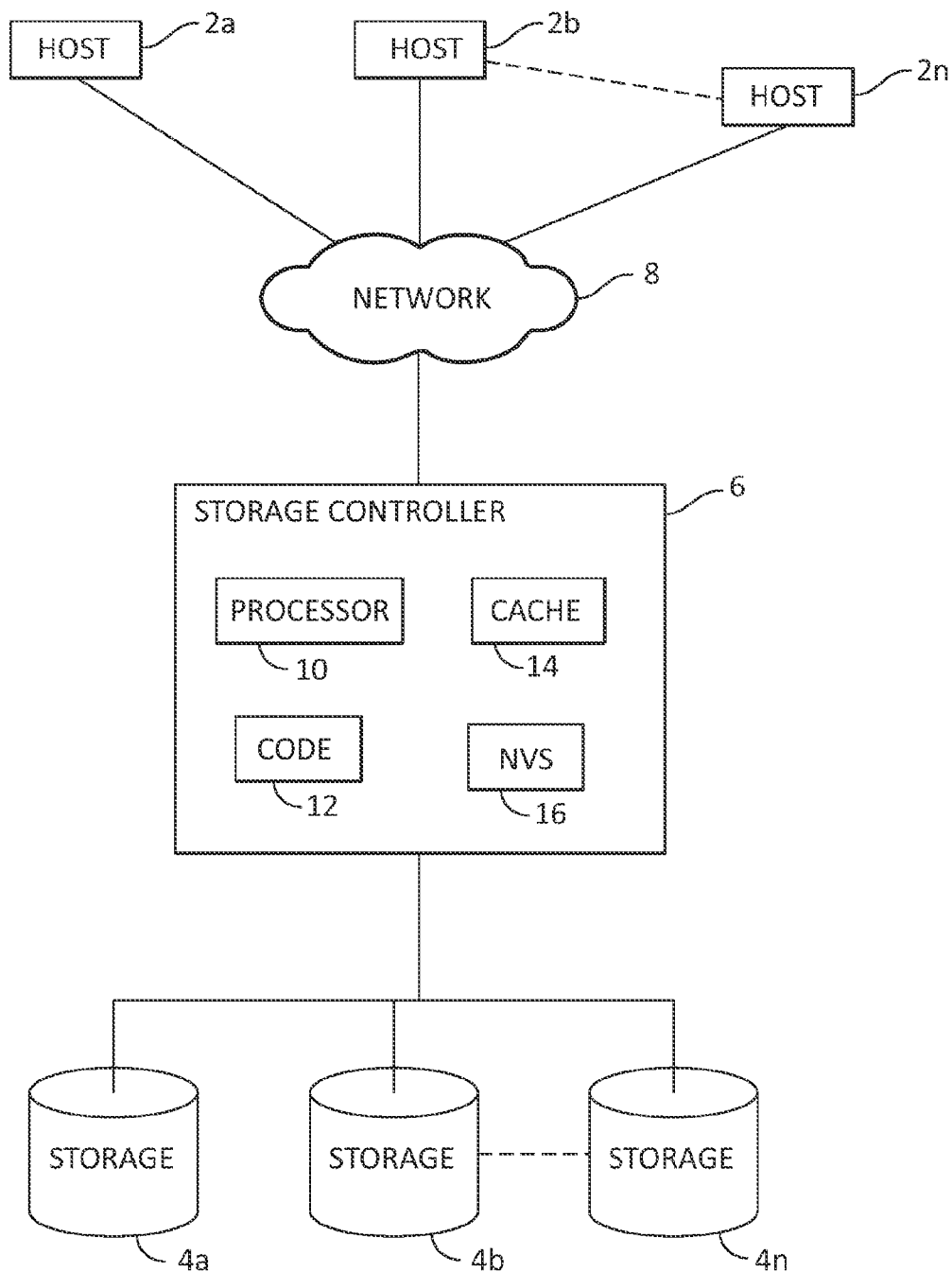
FIG. 1 is a block diagram of an exemplary computing environment in which aspects of the present invention and claimed subject matter are implemented.

In the following description, reference is made to the accompanying drawings which form a part hereof and which illustrate several embodiments of the present invention. It is understood that other embodiments may be utilized and structural and operational changes may be made without departing from the scope of the present invention. FIG. 1 illustrates a computing environment in which aspects of the invention are implemented. A plurality of host systems 2a, b . . . n transmit Input/Output (I/O) requests to one or more storage devices 4a, b . . . n through a storage controller 6 which manages access to the storage devices 4a, b . . . n. In certain implementations, the storage devices 4a, b . . . n are comprised of a plurality of hard disk drives organized as Just a Bunch of disks (JBOD), a RAID array, Direct Access Storage Devices (DASD), etc. Further, a storage device 4a, b . . . n may comprise a logical storage device, such as a RAID or JBOD rank. The host systems 2a, b . . . n communicate with the storage controller 6 over a network 8, such as the Internet, a Storage Area Network (SAN), an Intranet, Local Area Network (LAN), Wide Area Network (WAN), etc., using a communication protocol such as TCP/IP, Fibre Channel, Ethernet, etc.

The storage controller 6 includes a processor 10 executing code 12 to perform storage controller operations. The storage controller 6 further includes a cache 14 and non-volatile storage unit 16, such as a battery backed-up memory device. The storage controller 6 stores in cache 14 data updates received from the hosts 2 a, b . . . n to write to the storage devices 4a, b . . . n as well as data read from the storage devices 4a, b . . . n to return to the hosts 2a, b . . . n. When operating in Fast Write mode, data updates received from the hosts 2a, b . . . n are copied to both cache 14 and the NVS 16. End status is returned to the host 2a, b . . . n sending the data update after the update is copied to both the cache 14 and NVS 16.

Figure 2:
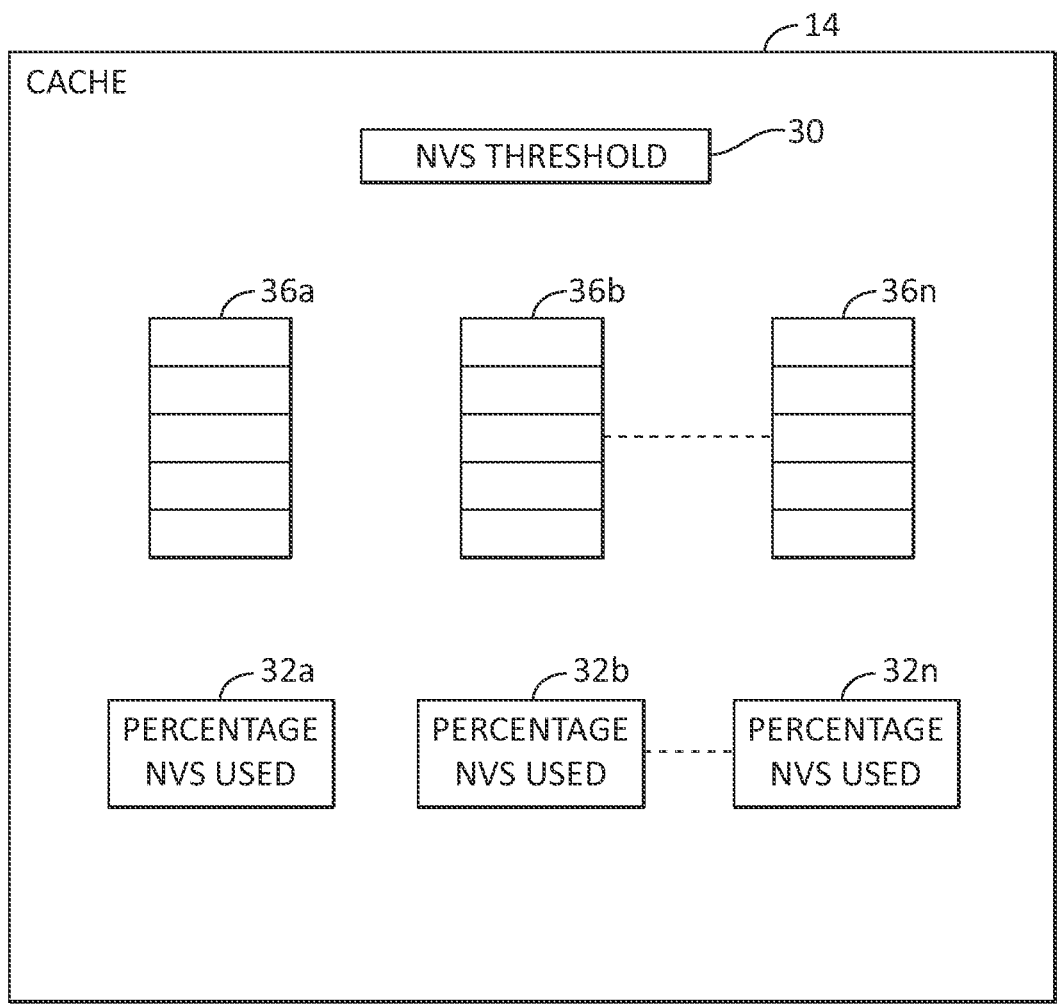
FIG. 2 is a block diagram of exemplary data structures maintained in the storage controller cache in accordance with implementations of the invention.

FIG. 2 illustrates further detail of the information the storage controller 6 maintains in cache 14 or some other storage or memory location. The cache 14 maintains an NVS threshold 30 indicating a maximum amount of storage space in the NVS 16 that may be used for updates to each storage device 4a, b . . . n. The cache 14 further maintains for each storage device, a percentage of NVS used 32a, b . . . n that indicates, for each storage device, the percentage of NVS 16 storing updates for the storage device 4a, b . . . n. In addition, for each storage device 4a, b . . . n, the cache 14 also includes a reconnect queue 36a, b . . . n. Each reconnect queue 36a, b . . . n includes entries of reconnect parameters to allow the processor 10 to reconnect to a channel to which the storage controller 6 issued a disconnect in response to receiving updates to a target storage device 4a, b . . . n when the NVS 16 already stored the threshold amount of storage space for that target storage device 4a, b . . . n.

In certain implementations where the storage device 4a, b . . . n is comprised of multiple disk drive units, such as the case with a RAID array, sequential updates are not destaged until an entire stripe unit of sequential updates is accumulated in the cache 14. After accumulating a stripe unit of updates, the updates are then destaged and striped to the disks of the target storage device 4a, b . . . n.

Figure 3:
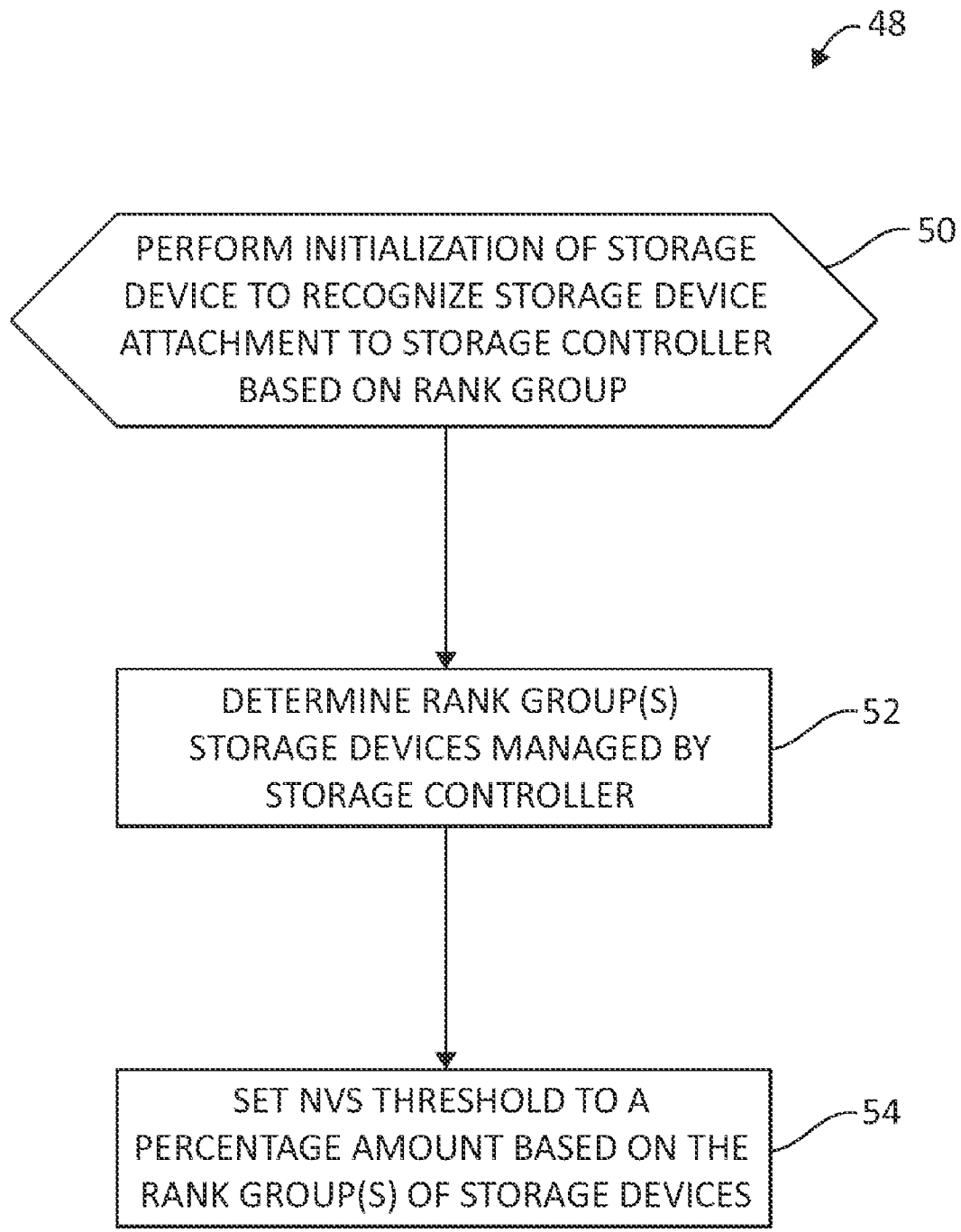
FIG. 3 is a flow chart diagram of exemplary logic to initialize an NVS threshold in accordance with implementations of the invention.

FIG. 3 illustrates logic 48 implemented in the code 12 to set the NVS threshold 30. At block 50, the processor 10 performs an initialization of one or more of the storage devices 4a, b . . . n as part of an initialization routine to recognize the attachment of various target storage devices based on their respective rank group. This initialization routine may be invoked during a reboot or restart operation in which the processor 10 would initialize all the storage devices 4a, b . . . n. Moreover, the initialization routine may be performed if a storage device or component thereof, such as a disk within the storage device, is removed or added from the group of storage devices 4a, b . . . n managed by the storage controller 6, such as the case of a hot reboot. In one example, the processor 10 may determine that a certain number of target storage devices are identified as SSD devices. The processor may also determine that an additional certain number of target storage devices are identified as Enterprise HDD devices.

At block 52, the processor 10 determines the rank groups of storage devices 4a, b . . . n attached to the storage controller 6. For example, the target storage devices identified as SSD devices are classified in the SSD rank group. Target storage devices identified as Enterprise HDD devices are classified in the Enterprise HDD rank group, a subgroup of the HDD rank group. Similarly, target storage devices identified as Nearline HDD devices are classified in the Nearline HDD rank group, also a subgroup of the HDD rank group.

At block 54, the NVS threshold is set to a percentage amount based on the rank group(s) of the target storage devices. Such an initial setting of the threshold is performed based on the types of target storage devices identified and classified in blocks 50 and 52. For example, in one embodiment, if only a single target storage device is identified, the NVS threshold is set to 100%, or in other words, 100% of the available NVS space is allocated to the single target storage device.

Continuing the exemplary embodiment, if a storage device identified as being a Nearline HDD device (and thereby classified in the Nearline rank group) exists only with other Enterprise rank group devices, the NVS threshold for the Enterprise rank group is set to at most, 99% of available NVS space (accordingly leaving at least 1% of available NVS space to the Nearline rank group device(s). When the Nearline rank group exists with either the Enterprise rank group or the SSD rank group, then the Nearline rank group is allowed to consume, at most, 50% of available NVS space. Finally, when the SSD rank group exists with either the Enterprise or Nearline HDD rank groups, then the SSD rank group is allowed to consume, at most, 99% of available NVS space.

In this way, NVS 16 space is over allocated on a storage device basis to accommodate those target storage devices 4a, b . . . n that are particularly busy, and at the same time limit the allocation of NVS 16 to avoid delays in processing updates to the other storage devices 4a, b . . . n in the event that the storage device 4a, b . . . n whose updates dominate NVS 16 fails or when the destaging operations to the dominating storage device 4a, b . . . n are particularly slow. As mentioned, destage operations to a storage device 4a, b . . . n may proceed at a particularly slow rate as a result of background operations on the storage device 4a, b . . . n, such as an operation to rebuild a disk drive, or a large proportion of random (non-sequential) updates.

Those skilled in the art will appreciate that there are alternative techniques that may be used to set the NVS threshold 30 based on the exemplary rank groups previously described, such as allocation of the NVS 16 space equally among the storage devices 4a, b . . . n. Still further, determination of the NVS threshold 30 based on rank group type may incorporate additional calculations for each storage device 4a, b . . . n as a weighted average of the storage capacity of the storage device 4a, b . . . n, thereby allocating more NVS 16 space to larger storage devices relative to smaller storage devices because larger storage devices are more likely to have greater I/O activity.

In certain implementations, the above designated allocations to each storage device 4a, b . . . n may apply during an entire session during which the storage controller 6 is available and receiving I/Os. This allocation may remain static during the entire session to always assure that the updates for one particularly busy storage device 4a, b . . . n does not unduly dominate the NVS 16 with the potential for significantly adversely affecting the updates to the other less busy storage devices 4a, b . . . n.

Figure 4:
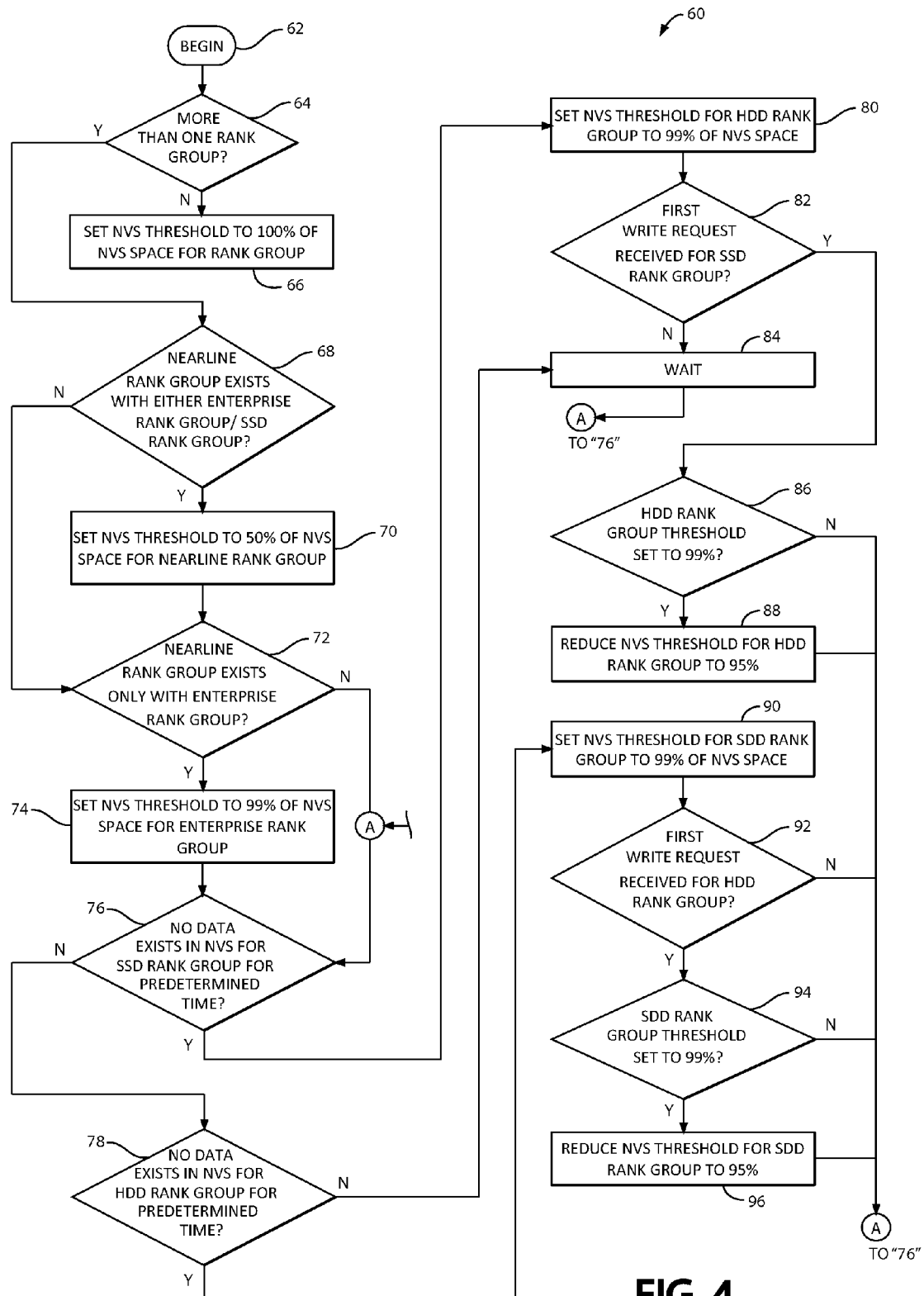
FIG. 4 is a flow chart diagram of exemplary logic for facilitating data transfer between an NVS write cache and a pool of target storage devices.

FIG. 4, following, illustrates exemplary logic for facilitating data transfer between an NVS write cache and a pool of target storage devices. As one skilled in the art will appreciate, various steps in the method 60 may be implemented in differing ways to suit a particular application. In addition, the described method may be implemented by various means, such as hardware, software, firmware, or a combination thereof operational on or otherwise associated with the computing storage environment. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 60 begins (step 62) with a query as to whether more than one rank group (e.g., target storage device(s) in Enterprise rank group and target storage device(s) in SSD rank group) is identified in the pool of storage devices (step 64). If this is not the case, then the NVS threshold is set to 100% of available NVS space for the single rank group (step 66), and the method returns to step 64 in the event that additional types of devices are later added to the storage pool.

In the event that more than one rank group is identified (again, step 64), then the method 60 queries as to whether the Nearline rank group is identified with either the Enterprise rank group or SSD rank group (step 68). If this is the case, then the NVS threshold is set to approximately 50% of the NVS space for the Nearline rank group (step 70). In other words, approximately half of the available NVS space is allocated to the Nearline rank group. If the Nearline rank group is determined to exist with only the Enterprise rank group (step 72), then the NVS threshold is set to approximately 99% of NVS space for the Enterprise rank group (step 74).

As a next step, the method 60 examines the write activity associated with the NVS over a period of time to determine if no data exists in the NVS for the SSD rank group (step 76). If this is the case, then the method 60 sets the NVS threshold for the HDD rank group to approximately 99% of the available NVS space (step 80). In the depicted embodiment, the allocation of NVS space is approximately 99%, although the skilled artisan will appreciate that in varying implementations, at least a majority of the NVS space is allocated to the HDD rank group. In this manner, the NVS space is allocated to the devices that are currently in use, allowing for the greatest performance and efficiency.

Once the NVS threshold is set to prefer the HDD rank group device(s), the system monitors write activity for the first write request being received for the SSD rank group, waiting until this is the case (steps 82, 84). Once the write request is received (again, step 82), then if the HDD rank group threshold is still set to approximately 99% of available NVS space, the method 60 reduces the NVS threshold for the HDD rank group to approximately 95% of the available NVS space. In this manner, the NVS threshold is reduced to allocate a greater portion of the NVS space to the SDD device(s). The method 60 then returns to step 76 to again monitor write activity.

Returning again to step 76, if data exists in the NVS for the SSD rank group, then the method 60 moves to step 78, which queries whether any data exists in NVS for the HDD rank group for the predetermined time. If no data is identified during the period of time, the method then moves to step 90, which sets the NVS threshold for the SDD rank group to approximately 99% of the available NVS space (or again at least the majority of available space in varying embodiments). Here again, the system devotes the greatest amount of resources of the NVS space to the devices that are currently using the space, and monitors the continuing write activity, waiting as necessary (again, step 84). Additionally, here as before, once the first write request is received for the HDD rank group (step 92), and the SDD rank group threshold is still at a higher percentage (step 94), then the NVS threshold for the SDD rank group is reduced to approximately 95% to allocate a greater percentage of the available NVS space to the HDD rank group.

Method 60 continues to monitor write activity and dynamically adjust NVS thresholding as previously described to maintain system performance. Again, the dynamic thresholding of reducing HDD rank group thresholding while SSD rank group write activity is active allows for the faster SSD ranks to not have to wait behind the slower HDD ranks to obtain NVS space. This in turn increases the SSD peak performance, but does not impact HDD performance while SSD write activity does not occur.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for facilitating data transfer between a non-volatile storage (NVS) write cache and a pool of target storage devices by a processor, comprising:
   determining each target storage device in the pool of target storage devices as one of a hard disk drive (HDD) and a solid state drive (SSD) device, the each target storage device classified into one of a SSD rank group and a HDD rank group in the pool of target storage devices;
   wherein if no data is received in the NVS write cache for a predetermined time to be written to a target storage device classified in the SSD rank group:
   setting a threshold of available space in the NVS write cache to allocate at least a majority of the available space to the HDD rank group, and
   upon receipt of a write request for the SSD rank group, reducing the threshold of the available space in the NVS write cache to allocate a greater portion of the available space to the SSD rank group.

2. The method of claim 1, further including, if no data is received in the NVS write cache for the predetermined time to be written to a target storage device in the HDD rank group:
- setting the threshold of the available space in the NVS write cache to allocate at least the majority of the available space to the to the SSD rank group, and
- upon receipt of a write request for the HDD rank group, reducing the threshold of the available space in the NVS write cache to allocate a greater portion of the available space to the HDD rank group.

3. The method of claim 2, wherein setting the threshold of the available space in the NVS write cache to allocate at least the majority of the available space to the SSD rank group includes setting the threshold of the available space to, at most, 99 percent of the available space, and reducing the threshold of the available space in the NVS write cache to allocate the greater portion of the available space to the HDD rank group includes reducing the threshold of the available space from, at most, 99 percent of the available space to, at most, 95 percent of the available space.

4. The method of claim 1, wherein setting the threshold of the available space in the NVS write cache to allocate at least the majority of the available space to the HDD rank group includes setting the threshold of the available space to, at most, 99 percent of the available space, and reducing the threshold of the available space in the NVS write cache to allocate the greater portion of the available space to the SSD rank group includes reducing the threshold of the available space from, at most, 99 percent of the available space to, at most, 95 percent of the available space.

5. The method of claim 1, further including detecting each target storage device in the pool of target storage devices.

6. The method of claim 1, wherein the HDD rank group includes a nearline rank group and an enterprise rank group, and further including, if the pool of target storage devices is determined to include storage devices classified in the nearline rank group and at least one of the enterprise rank group and the SSD rank group, setting the threshold of the available space in the NVS write cache to allocate, at most, 50 percent of the available space to the nearline rank group.

7. The method of claim 1, wherein the HDD rank group includes a nearline rank group and an enterprise rank group, and further including, if the pool of target storage devices is determined to include storage devices classified in the enterprise rank group and the nearline rank group, setting the threshold of the available space in the NVS write cache to allocate, at most, 99 percent of the available space to the enterprise rank group.

8. The method of claim 1, wherein the HDD rank group includes a nearline rank group and an enterprise rank group, and further including if the pool of target storage devices is determined to include storage devices classified in the SSD rank group, the nearline rank group, and the enterprise rank group, allocating an equal amount of the available space to each of the HDD rank group and the SSD rank group.

9. The method of claim 1, further including, if the pool of target storage devices is determined to include storage devices classified in only one of the HDD rank group or the SSD rank group, allocating the entire amount of available space to the storage devices classified in the only one of the HDD rank group or the SSD rank group.

10. The method of claim 1, wherein the determining each target storage device in the pool of target storage devices as one of a hard disk drive (HDD) and a solid state drive (SSD) device is performed at initialization and whenever one storage device is added or removed to the pool of target storage devices.

11. A system for facilitating data transfer between a nonvolatile storage (NVS) write cache and a pool of target storage devices, comprising:
- a processor device operably coupled to the NVS write cache and the pool of target storage devices, wherein the processor device is adapted for:
  - determining each target storage device in the pool of target storage devices as one of a hard disk drive (HDD) and a solid state drive (SSD) device, the each target storage device classified into one of a SSD rank group and a HDD rank group in the pool of target storage devices; wherein if no data is received in the NVS write cache for a predetermined time to be written to a target storage device classified in the SSD rank group:
    - setting a threshold of available space in the NVS write cache to allocate at least a majority of the available space to the HDD rank group, and
    - upon receipt of a write request for the SSD rank group, reducing the threshold of the available space in the NVS write cache to allocate a greater portion of the available space to the SSD rank group.

12. The system of claim 11, wherein the processor device is further adapted for, if no data is received in the NVS write cache for the predetermined time to be written to a target storage device in the HDD rank group:
- setting the threshold of the available space in the NVS write cache to allocate at least the majority of the available space to the to the SSD rank group, and
- upon receipt of a write request for the HDD rank group, reducing the threshold of the available space in the NVS write cache to allocate a greater portion of the available space to the HDD rank group.

13. The system of claim 12, wherein the processor is further adapted for, pursuant to setting the threshold of the available space in the NVS write cache to allocate at least the majority of the available space to the SSD rank group, setting the threshold of the available space to, at most, 99 percent of the available space, and pursuant to reducing the threshold of the available space in the NVS write cache to allocate the greater portion of the available space to the HDD rank group, reducing the threshold of the available space from, at most, 99 percent of the available space to, at most, 95 percent of the available space.

14. The system of claim 11, wherein the processor is further adapted for, pursuant to setting the threshold of the available space in the NVS write cache to allocate at least the majority of the available space to the HDD rank group, setting the threshold of the available space to, at most, 99 percent of the available space, and pursuant to reducing the threshold of the available space in the NVS write cache to allocate the greater portion of the available space to the SSD rank group, reducing the threshold of the available space from, at most, 99 percent of the available space to, at most, 95 percent of the available space.

15. The system of claim 11, wherein the HDD rank group includes a nearline rank group and an enterprise rank group, and the processor device is further adapted for, if the pool of target storage devices is determined to include storage devices classified in the nearline rank group and at least one of the enterprise rank group and the SSD rank group, setting the threshold of the available space in the NVS write cache to allocate, at most, 50 percent of the available space to the nearline rank group.

16. The system of claim 11, wherein the HDD rank group includes a nearline rank group and an enterprise rank group, and the processor device is further adapted for, if the pool of target storage devices is determined to include storage devices classified in the enterprise rank group and the nearline rank group, setting the threshold of the available space in the NVS write cache to allocate, at most, 99 percent of the available space to the enterprise rank group.

17. The system of claim 11, wherein the HDD rank group includes a nearline rank group and an enterprise rank group, and the processor device is further adapted for, if the pool of target storage devices is determined to include storage devices classified in the SSD rank group, the nearline rank group, and the enterprise rank group, allocating an equal amount of the available space to each of the HDD rank group and the SSD rank group.

18. The system of claim 11, wherein the processor device is further adapted for, if the pool of target storage devices is determined to include storage devices classified in only one of the HDD rank group or the SSD rank group, allocating the entire amount of available space to the storage devices classified in the only one of the HDD rank group or the SSD rank group.

19. A computer program product for facilitating data transfer between a nonvolatile storage (NVS) write cache and a pool of target storage devices by a processor, the computer program product comprising a computer-readable storage medium having computer-readable program code portions stored therein, the computer-readable program code portions comprising:
a first executable portion for determining each target storage device in the pool of target storage devices as one of a hard disk drive (HDD) and a solid state drive (SSD) device, the each target storage device classified into one of a SSD rank group and a HDD rank group in the pool of target storage devices; wherein if no data is received in the NVS write cache for a predetermined time to be written to a target storage device classified in the SSD rank group:
setting a threshold of available space in the NVS write cache to allocate at least a majority of the available space to the HDD rank group, and
upon receipt of a write request for the SSD rank group, reducing the threshold of the available space in the NVS write cache to allocate a greater portion of the available space to the SSD rank group.

20. The computer program product of claim 19, further including a second executable portion for, if no data is received in the NVS write cache for the predetermined time to be written to a target storage device in the HDD rank group:
setting the threshold of the available space in the NVS write cache to allocate at least the majority of the available space to the to the SSD rank group, and
upon receipt of a write request for the HDD rank group, reducing the threshold of the available space in the NVS write cache to allocate a greater portion of the available space to the HDD rank group.

21. The computer program product of claim 19, wherein the HDD rank group includes a nearline rank group and an enterprise rank group, and further including a second executable portion for, if the pool of target storage devices is determined to include storage devices classified in the nearline rank group and at least one of the enterprise rank group and the SSD rank group, setting the threshold of the available space in the NVS write cache to allocate, at most, 50 percent of the available space to the nearline rank group.

22. The computer program product of claim 19, wherein the HDD rank group includes a nearline rank group and an enterprise rank group, and further including a second executable portion for, if the pool of target storage devices is determined to include storage devices classified in the enterprise rank group and the nearline rank group, setting the threshold of the available space in the NVS write cache to allocate, at most, 99 percent of the available space to the enterprise rank group.

23. The computer program product of claim 19, wherein the HDD rank group includes a nearline rank group and an enterprise rank group, and further including:
a second executable portion for, if the pool of target storage devices is determined to include storage devices classified in the SSD rank group, the nearline rank group, and the enterprise rank group, allocating an equal amount of the available space to each of the HDD rank group and the SSD rank group, and
a third executable portion for, if the pool of target storage devices is determined to include storage devices classified in only one of the HDD rank group or the SSD rank group, allocating the entire amount of available space to the storage devices classified in the only one of the HDD rank group or the SSD rank group.

24. A method of manufacturing a system for facilitating data transfer between a nonvolatile storage (NVS) write cache and a pool of target storage devices, comprising:
providing a processor device operably coupled to the NVS write cache and the pool of target storage devices, wherein the processor device is adapted for:
determining each target storage device in the pool of target storage devices as one of a hard disk drive (HDD) and a solid state drive (SSD) device, the each target storage device classified into one of a SSD rank group and a HDD rank group in the pool of target storage devices; wherein if no data is received in the NVS write cache for a predetermined time to be written to a target storage device classified in the SSD rank group:
setting a threshold of available space in the NVS write cache to allocate at least a majority of the available space to the HDD rank group, and
upon receipt of a write request for the SSD rank group, reducing the threshold of the available space in the NVS write cache to allocate a greater portion of the available space to the SSD rank group.

25. The method of manufacture of claim 24, wherein the processor device is further adapted for, if no data is received in the NVS write cache for the predetermined time to be written to a target storage device in the HDD rank group:
setting the threshold of the available space in the NVS write cache to allocate at least the majority of the available space to the to the SSD rank group, and
upon receipt of a write request for the HDD rank group, reducing the threshold of the available space in the NVS write cache to allocate a greater portion of the available space to the HDD rank group.

* * * * *